US005245164A

United States Patent [19]

Oyama

[11] Patent Number: 5,245,164

[45] Date of Patent: Sep. 14, 1993

[54] TRANSACTION PROCESSING APPARATUS

[75] Inventor: Masaki Oyama, Shiga, Japan

[73] Assignee: Omron Corporation, Kyoto, Japan

[21] Appl. No.: 776,376

[22] PCT Filed: Mar. 29, 1991

[86] PCT No.: PCT/JP91/00414

§ 371 Date: Jan. 27, 1992

§ 102(e) Date: Jan. 27, 1992

[87] PCT Pub. No.: WO91/15834

PCT Pub. Date: Oct. 17, 1991

[30] Foreign Application Priority Data

Apr. 3, 1990 [JP] Japan .................................. 2-89870

[51] Int. Cl.[5] .............................................. G06F 15/30

[52] U.S. Cl. ...................................... 235/379; 902/22; 902/24

[58] Field of Search ..................... 235/379; 902/22, 24

[56] References Cited

U.S. PATENT DOCUMENTS 4,302,810 11/1981 Bouricius ............................ 902/22

FOREIGN PATENT DOCUMENTS 0275086 7/1988 European Pat. Off. .

*Primary Examiner*—Harold Pitts

*Attorney, Agent, or Firm*—Dickstein, Shapiro & Morin

[57] ABSTRACT

A transaction processing apparatus includes a transaction processing terminal for registering data related to transaction processing, an external memory connected to the transaction processing terminal for collecting and storing the data related to transaction processing registered by the transaction processing terminal and a monitoring terminal connected to the external memory for periodically accessing and monitoring the external memory. The transaction processing terminal inhibits data transmission to the external memory when transmission of the data related to transaction processing to the external memory goes defective. The monitoring terminal transmits a signal for releasing the inhibition of data transmission to the transaction processing terminal when the data transmission between the transaction processing terminal and the external memory goes defective and then the data transmission is restored to a normal state. The transaction processing terminal releases the inhibition of the data transmission and allows data transmission in response to the inhibition releasing signal from the monitoring terminal.

5 Claims, 6 Drawing Sheets

FIG. 3

20

| KIND OF DATA | DATA COUNT | COMMODITY NO. | THE NUMBER OF COMMODITIES SOLD SALES | THE AMOUNT OF COMMODITIES SOLD SALES |
|---|---|---|---|---|
| "CP" | 0001 | PLU0123 | 2 PIECES | 12300 YEN |

FIG. 4

30

| ADDRESS OF DEVICE | COMMAND | FILE NAME |
|---|---|---|
| $61 | $44 | "CP" |

FIG. 5

40

| ADDRESS OF POS TERMINAL | COMMAND |
|---|---|
| $01 | $43 |
| $02 | $43 |
| ⋮ | ⋮ |
| $n | $43 |

TRANSACTION PROCESSING APPARATUS

TECHNICAL FIELD

The present invention relates to transaction processing apparatuses, and more particularly, to transaction processing apparatuses including a transaction processing terminal for registering data related to transaction processing, collection and storage means connected to the transaction processing terminal for collecting and storing the data related to transaction processing registered by the transaction processing terminal and a monitoring terminal connected to the collection and storage means for periodically accessing and monitoring the collection and storage means.

BACKGROUND ART

A POS system is conventionally known which includes a plurality of POS (Point of Sales) terminals and an external storage device connected through a transmission line. In such a POS system, while sales information registered by an operator by using a POS terminal is printed on a receipt, the information is transmitted to the external storage device wherein the information is stored in a file provided therein. Storing sales information and the like in a file is referred to as capturing and the file provided in an external storage device is called a capturing file. The state of a POS terminal where transmitting sales information is transmitted from the POS terminal to a capturing file for storing is called a capturing-on state.

At the time of capturing, a defective capturing file prevents a POS terminal from performing capturing. Such state of the POS terminal disabling the capturing is referred to as a capturing-off state. In a capturing-off state, an operator or a person in charge of maintenance called for by an operator removes the defect of the capturing file and manipulates a keyboard of each POS terminal to perform a key operation necessary for entering a capturing-on state.

As described above, the conventional POS system requires a key operation to be performed at each POS terminal to switch a capturing-off state of the terminal to a capturing-on state, which consumes much time and labor of an operator when numerous POS terminals are connected to one transmission line.

A main object of the present invention is therefore to switch each POS terminal from a capturing-off state to a capturing-on state with ease in a short time period.

SUMMARY OF THE INVENTION

The present invention is directed to a transaction processing apparatus including a transaction processing terminal for registering data related to transaction processing, collection and storage means for collecting and storing the data related to transaction processing registered by the transaction processing terminal, and a monitoring terminal connected to the collection and storage means for periodically accessing and monitoring the collection and storage means, the monitoring terminal including signal outputting means for transmitting a signal for releasing inhibition of data transmission to the transaction processing terminal when data transmission between the transaction processing terminal and the collection and storage means goes defective and then returns to a normal state.

The above transaction processing terminal includes data transmission control means for inhibiting data transmission to the collection and storage means when data transmission related to transaction processing to the collection and storage means goes defective and acknowledging data transmission in response to an inhibition release signal from the monitoring terminal.

According to the present invention, the monitoring terminal sends a signal for releasing inhibition of data transmission to the transaction processing terminal. More specifically, the monitoring terminal transmits a signal for switching each POS terminal from a capturing-off state to a capturing-on state to the respective POS terminals As a result, each POS terminal automatically switches to a capturing-on state.

BRIEF DESCRIPTION OF THE DRAWINGS

FIGS. 3, 4 and 5 are diagrams showing telegraphic messages transmitted on the data transmission line shown in FIG. 1.

BEST MODE FOR IMPLEMENTING THE INVENTION

Figure 1:
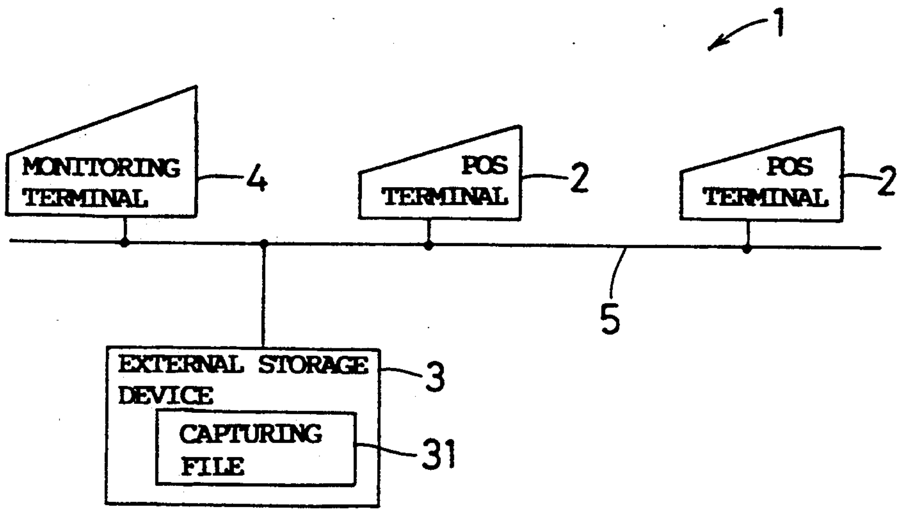
FIG. 1 is a diagram showing a structure of a POS system according to one embodiment of the present invention.

FIG. 1 is a diagram showing the structure of a POS system according to one embodiment of the present invention. A POS system 1 includes a plurality of POS terminals 2, an external storage device 3, a monitoring terminal 4 and a transmission line 5. The POS terminal 2 registers such sales information as a commodity code, price and the number of commodities purchased by a customer. The external storage device 3 collects and stores the sales information transmitted from the POS terminals 2. The external storage device 3 includes a capturing file 31 for storing the sales information. The monitoring terminal 4 periodically accesses the external storage device 3 to monitor the capturing file 31 to see whether the file is defective or not. The transmission line 5 is used for transmitting data among the POS terminals 2, the external storage device 3 and the monitoring terminal 4.

Figure 2:
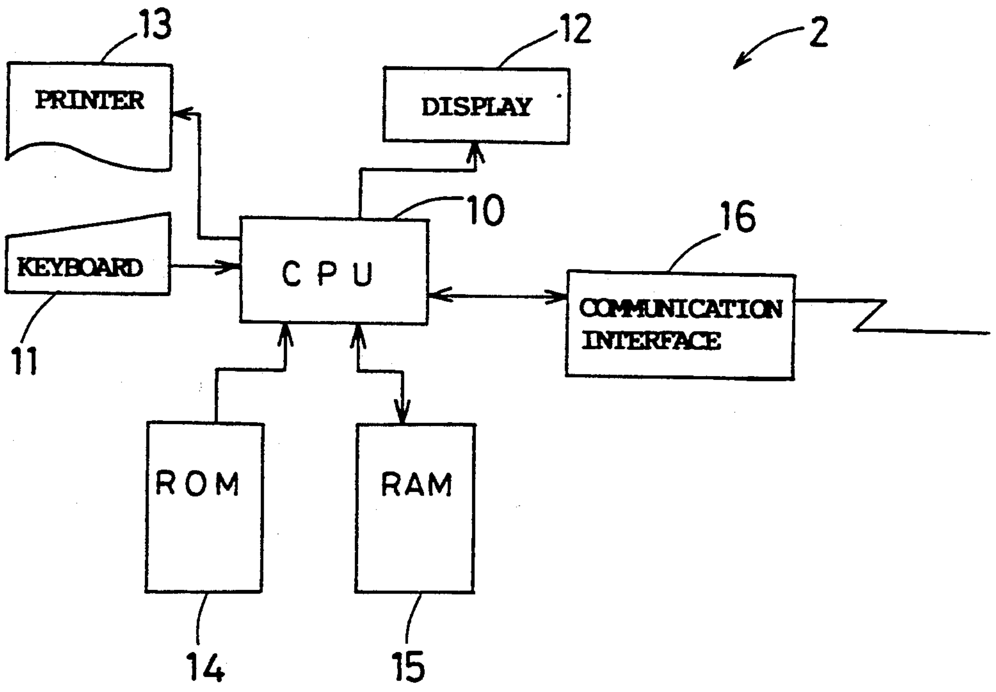
FIG. 2 is a schematic block diagram showing an electrical structure of the POS terminal shown in FIG. 1.

FIG. 2 is a schematic block diagram showing the electrical structure of the POS terminal 2 shown in FIG. 1. In FIG. 2, the POS terminal 2 includes a CPU 10. The CPU 10 is connected to a keyboard 11, a display 12, a printer 13, an ROM (Read Only Memory) 14, an RAM (Random Access Memory) 15 and a communication interface 16. The keyboard 11 is used for inputting a commodity code, a payment and the like of a commodity to be sold. A scanner can be used for inputting a commodity code. The display 12 displays the data input by the keyboard 11 and a result of an operation by the CPU 10 etc., while the printer 13 prints such data and results. The ROM 14 stores an operation processor of the CPU 10. The RAM 15 temporarily stores sales information input by means of the keyboard 11 and the like. The communication interface 16 is used for transmitting data through the data transmission line 5.

No detailed description will be made of the electrical structure of the communication terminal 4 which is substantially the same as that of the POS terminal 2 shown in FIG. 2. One of the plurality of POS terminals 2 can be used as the monitoring terminal 4. In this case, the ROM 14 of the POS terminal used as a monitoring terminal stores program for monitoring the capturing file 31 in addition to the program for register processing.

FIGS. 3, 4 and 5 are diagrams explaining telegraphic messages transmitted on the data transmission line 5, FIG. 3 showing a format of sales information transmitted from the POS terminal 2 to the external storage device 3, FIG. 4 showing a format of a command transmitted from the monitoring terminal 4 to the external storage device 3 for checking the capturing file 31 and FIG. 5 showing a format of a command transmitted from the monitoring terminal 4 to the respective POS terminals 2 for switching the POS terminals from a capturing-off state to a capturing-on state.

In FIG. 3, sales information 20 comprises information indicative of a kind of data, information indicative of the number of sales data, information indicative of a commodity number, information indicative of the number of commodities sold and information indicative of sales.

A capturing file check command 30 shown in FIG. 4 includes information indicative of an address of the device to which the command is to be transmitted, a command for checking a capturing file and information indicative of the name of a file to be checked. Herein, the device to which the capturing file check command 30 is transmitted is the external storage device 3.

In FIG. 5, a capturing-on command 40 includes information indicative of an address of a POS terminal to be rendered capturing-on and a command for rendering the POS terminal capturing-on.

Figure 6A:
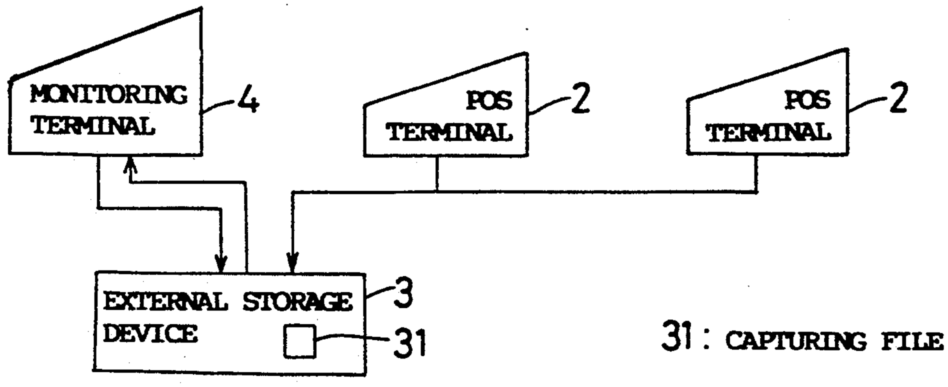
FIGS. 6A, 6B and 6C are diagrams explaining an operation according to one embodiment of the present invention.
Figure 6B:
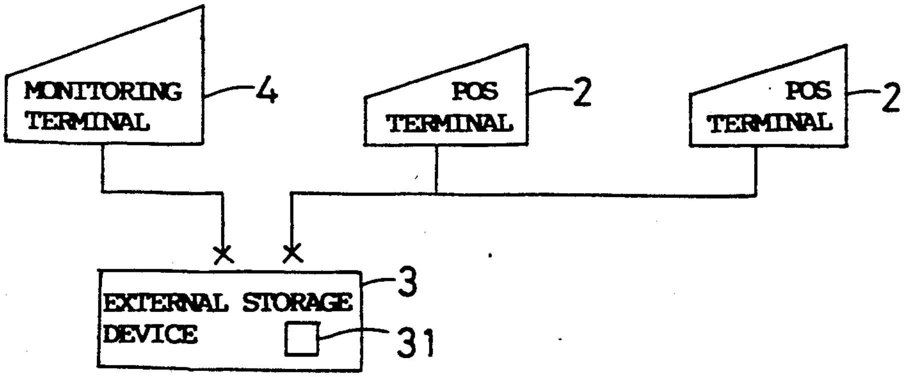
Figure 6C:
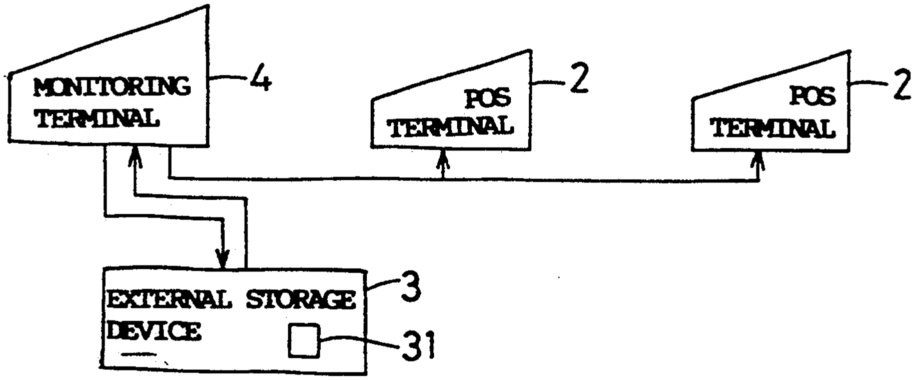

FIGS. 6A, 6B and 6C are diagrams explaining an operation according to one embodiment of the present invention, 6A showing normal access to a capturing file, 6B showing defective access to a capturing file and 6C showing resumed normal access to a capturing file.

When normal access is being made to the capturing file 31, each POS terminal 2 normally transmits the sales information 20 shown in FIG. 3 to the external storage device 3 including the capturing file 31, as shown in FIG. 6A. The respective POS terminals 2 are at a capturing-on state. In this case, the monitoring terminal 4 periodically transmits the capturing file check command 30 shown in FIG. 4 to the external storage device 3 to receive a response signal from the external storage device 3.

When the access to the capturing file goes defective, the respective POS terminals 2 are forced to enter a capturing-off state as shown in FIG. 6B. At this time, the external storage device 3 sends out no response signal even at a reception of the capturing check command 30 from the monitoring terminal 4.

When the cause of the defective access to the capturing file 31 is remedied in the POS terminal 2 to enable transmission, the external storage device resumes transmission of a signal responsive to the capturing file command 30 of the monitoring terminal 4 as shown in FIG. 6C. On receiving the response signal, the monitoring terminal 4 sends the capturing-on command 40 to each POS terminal 2. The POS terminal 2 automatically enters a capturing-on state at the reception of the command. At the switching of the capturing-off state to a capturing-on state, each POS terminal 2 re-transmits the file which has been transmitted at the time of the switching to the capturing-off state and transmits the sales information registered by the POS terminals during a period from a start of a capturing-off state to a change to a capturing-on state.

The reason why the POS terminals are forced to a capturing-off state when the access to the capturing-file 31 by the POS terminals 2 goes defective and the POS terminal is set to a capturing-on state in response to the capturing-on command 40 at a stage where normal transmission becomes possible is to declare that the file is in a capturing-on state before resuming data transmission, since if registration of sales to a customer B is being carried out when transmission of sales information on a customer A is resumed after a transmission error, the sales information on the customer B comes to be transmitted, resulting in recording of the information linking part of the sales information on the customer A with the sales information on the customer B, which makes the file less reliable.

Figure 7:
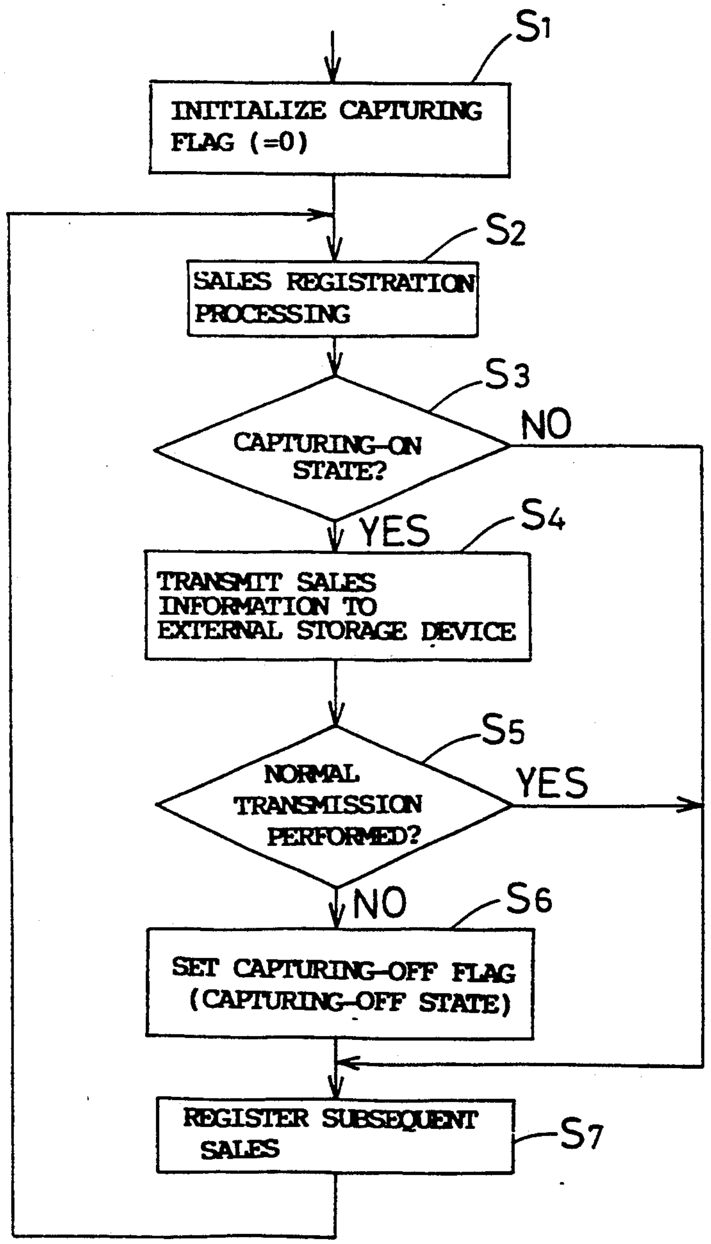
FIG. 7 is a flow chart showing an operation of the POS terminal shown in FIG. 1 at the time of registering sales.
Figure 8:
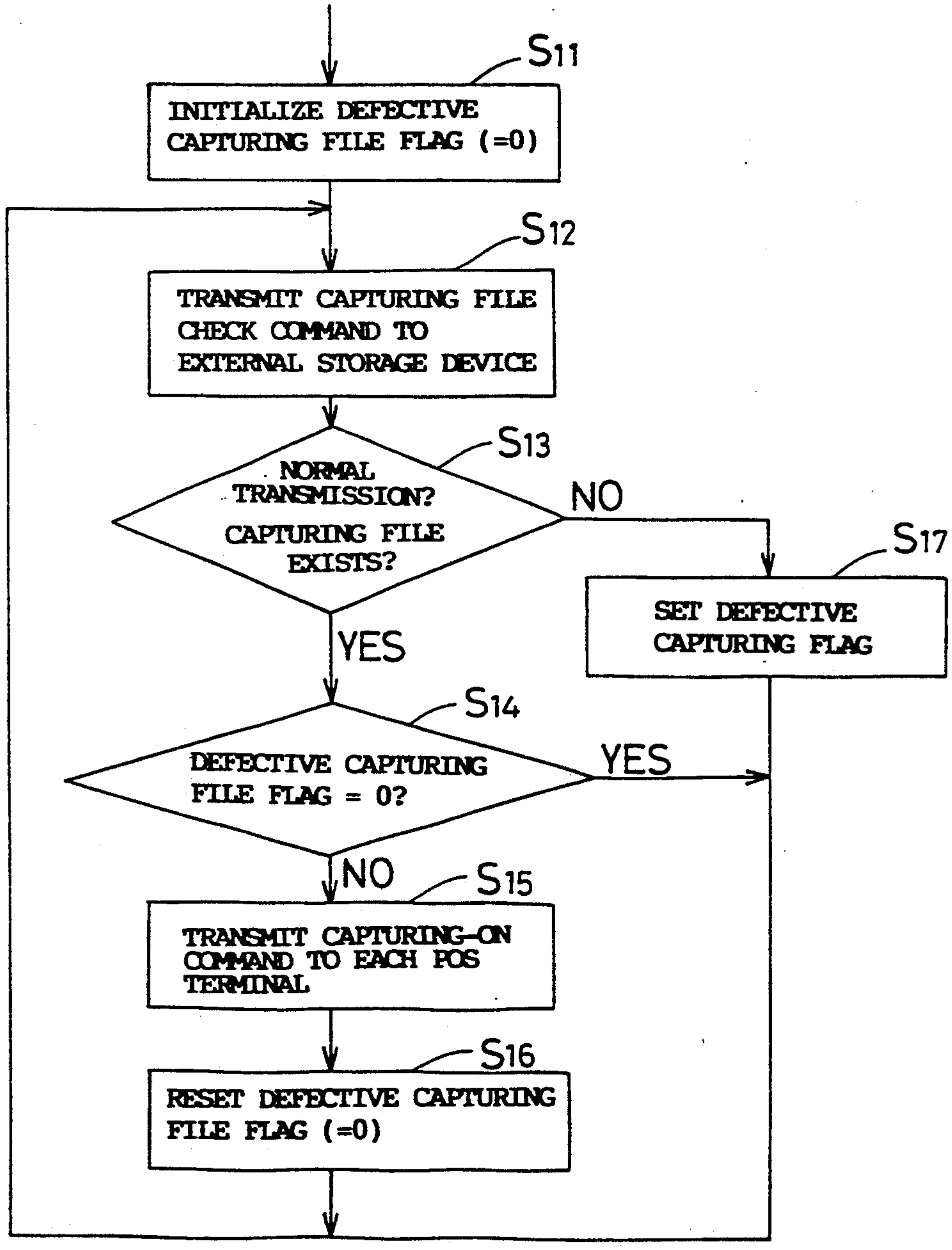
FIG. 8 is a flow chart showing an operation of a monitoring terminal.
Figure 9:
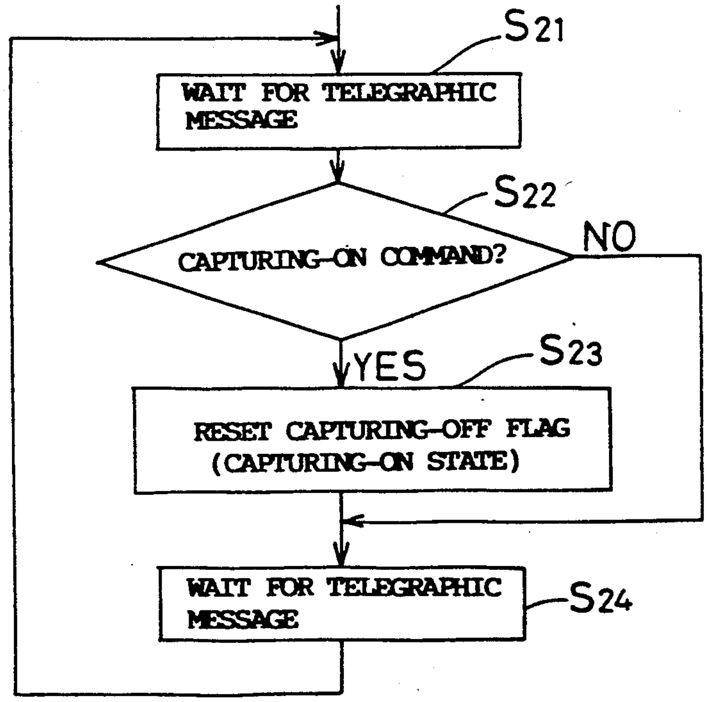
FIG. 9 is a flow chart showing an operation of a POS terminal receiving a capturing-on-command from the monitoring terminal.

FIG. 7 is a flow chart showing the operation of the POS terminal at the time of registration of sales, FIG. 8 is a flow chart showing the operation of the monitoring terminal and FIG. 9 is a flow chart showing the operation of the POS terminal when receiving a capturing-on command from the monitoring terminal. With reference to FIGS. 7 to 9, operation of the POS system will be described.

First with reference to FIG. 7, operation of the POS terminal at the time of registering sales will be described. At step S1, a capturing-off flag is initialized. More specifically, the capturing-off flag indicative of the capturing-on/off state of the POS terminal is reset to enter a capturing-on state. Then at step S2, processing for sale registration is carried out. Subsequently at step S3, a determination is made as to whether the terminal is in a capturing-on state or not. If the capturing-off flag indicates 0, that is, when capturing is possible, the program proceeds to step S4, while if the capturing-off flag indicates 1, that is, when capturing is impossible, program proceeds to step S7. At step S4, the sales information 20 shown in FIG. 3 is transmitted to the external storage device 3. Subsequently at step S5, determination is made as to whether sales information has been normally transmitted or not. If the information has been normally transmitted, the program proceeds to step S7 to perform subsequent sales registration. On the other hand, when normal data transmission has not been done, the program proceeds to step S6 to set the capturing-off flag to 1. That is, the POS terminal is set to enter a capturing-off state. Even in the capturing-off state, sales registration processing can be performed wherein sales information input by a keyboard is temporarily stored in the RAM 15 shown in FIG. 2.

With reference to FIG. 8, operation of the monitoring terminal will be described. At step S11, a defective capturing file flag is initialized. More specifically, the defective capturing file flag is reset which indicates whether normal transmission to the external storage device 3 has been performed or not. Such state corresponds to an execution of normal capturing. Subsequently at step S12, the capturing file check command 30 shown in FIG. 4 is transmitted from the monitoring terminal 4 to the external storage device 3. This transmission is performed at an interval of 5 seconds, for example. Subsequently at step S13, the existence and the contents of a response signal from the external storage device 3 determines whether normal data transmission is being performed or not and whether a relevant capturing file 31 exists in the external storage device 3 or not. If the normal transmission is being performed and the capturing file 31 exists, the program proceeds to step S14. If not, the program proceeds to step S17 to set the defective capturing file flag to 1 in order to store a capturing-off state.

At step S14, the defective capturing file flag is checked and when the result of the previous transmission of the capturing file check command 30 is found normal, that is, if in the capturing-on state, the program returns to step S12 to transmit the capturing file check command 30.

On the other hand, when the result of the previous transmission of the capturing file check command is found defective, the capturing-on command 40 shown in FIG. 5 is transmitted to each POS terminal in order to release the capturing-off state of the POS terminal as the cause of the defective transmission has been already removed. Subsequently at step S16, the defective capturing file flag is reset, which is followed by step S12 for transmitting a subsequent capturing file check command 30.

With reference to FIG. 9, operation of the POS terminal when receiving a capturing-on command from the monitoring terminal will be described. At step S21, the terminal waits for a reception of a telegraphic message from the monitoring terminal 4. When receiving the telegraphic message from the monitoring terminal 4, the program proceeds to step S22 wherein determination is made as to whether the transmitted telegraphic message is a capturing-on command or not. If the transmitted telegraphic message is not a capturing-on command, the program proceeds to step S24 to wait for a reception of a telegraphic message again. On the other hand, if the transmitted telegraphic message is the capturing-on command 40 shown in FIG. 5, the capturing-off flag is reset at step S23 to cause the POS terminal 20 to automatically enter a capturing-on state.

As described in the foregoing, since the monitoring terminal 4 periodically accesses the capturing file 31 such that a capturing-on command is transmitted to each POS terminal 2 to automatically enter a capturing-on state at the change of the access to the capturing file 31 from a defective state to a normal state, it is not necessary for an operator to operate keys of each POS terminal every time the POS terminal should enter a capturing-on state.

APPLICABILITY IN INDUSTRY

As described above, when data transmission from a transaction processing terminal to collection and storage means goes defective and then the data transmission is restored to a normal state, the present invention requires no operation of the transaction processing terminal by an operator for releasing inhibition of the data transmission, allowing the operator to keep his mind on remedying the defective data transmission, thereby drastically reducing time and labor required for resuming data transmission.

I claim:

1. A transaction processing apparatus comprising:

a transaction processing terminal for registering data related to transaction processing, collecting and storing means connected to said transaction processing terminal for collecting and storing the data related to transaction processing registered by said transaction processing terminal, and a monitoring terminal connected to said collecting and storing means for accessing and monitoring said collecting and storing means, said transaction processing terminal including data transmission inhibiting means for inhibiting data transmission to said collecting and storing means when the data transmission related to transaction processing to said collecting and storing means goes defective, said monitoring terminal including data transmission inhibition releasing signal outputting means for detecting a return to a normal state of the defective data transmission between said transaction processing terminal and said collecting and storing means to transmit a signal for releasing data transmission to said transaction processing terminal, said transaction processing terminal including data transmission inhibition releasing means responsive to the data transmission inhibition releasing signal from said data transmission inhibition releasing signal outputting means for releasing the inhibition of the data transmission and allowing data transmission.

2. The transaction processing terminal according to claim 1, wherein said monitoring terminal periodically accesses and monitors said collecting and storing means.

3. A transaction processing terminal comprising:

a transaction processing terminal for registering data related to transaction processing, collecting and storing means connected to said transaction processing terminal for collecting and storing the data related to transaction processing registered by said transaction processing terminal, a monitoring terminal connected to said collecting and storing means for accessing said collecting and storing means to monitor said storing means to find whether the state thereof is normal or not, means for inhibiting data transmission between said transaction processing terminal and said collecting and storing means when said collecting and storing means is defective, and data transmission inhibition releasing means responsive to a detection, by said monitoring terminal, of the return of said collecting and storing means to a normal state after said data transmission is inhibited by said data transmission inhibiting means, for releasing the inhibition of said data transmission by said data transmission inhibiting means to allow data transmission between said transaction processing terminal and said collecting and storing means.

4. The transaction processing apparatus according to claim 3, wherein said transaction processing terminal includes temporary storage means for temporarily storing data related to the transaction processing processed during the inhibition of the data transmission by said data transmission inhibiting means.

5. A transaction processing system comprising:

a transaction processing terminal for registering data related to transaction processing, a data transmission line, collecting and storing means connected to said transaction processing terminal through said data transmission line for collecting and storing the data related to transaction processing registered by said transaction processing terminal, and a monitoring terminal connected to said collecting and storing means through said data transmission line for monitoring said collecting and storing means to find whether the state thereof is normal or not, said transaction processing terminal including:

means for inhibiting data transmission of said data related to transaction processing to said collecting and storing means when said collecting and storing means goes defective, and storage means for temporarily storing data related to transaction processing performed when data transmission is inhibited by said data transmission inhibiting means, said monitoring terminal including:

means for detecting the return of said collecting and storing means from a defective state to a normal state, data transmission inhibition releasing signal outputting means responsive to a return of normal state detection output of said means for detecting the return to a normal state for transmitting a signal for releasing said inhibition of data transmission between said transaction processing terminal and said collecting and storing means to said transaction processing terminal, said transaction processing terminal further including:

data transmission inhibition releasing means responsive to the data transmission inhibition releasing signal from said data transmission inhibition releasing signal outputting means for releasing the inhibition of said data transmission to transmit the data stored in said temporary storage means to said collecting and storing means.

* * * * *